(12) United States Patent
Lee et al.

(10) Patent No.: US 7,277,142 B2
(45) Date of Patent: Oct. 2, 2007

(54) COLOR FILTER SUBSTRATE AND METHOD FOR FABRICATING THEREOF

(75) Inventors: Dong-Hoon Lee, Gyungsangbuk-Do (KR); Dong-Hyo Gu, Gyeonggi-Do (KR)

(73) Assignee: LG Philips LCD Co., Ltd., Seoul (KR)

( * ) Notice: Subject to any disclaimer, the term of this patent is extended or adjusted under 35 U.S.C. 154(b) by 190 days.

(21) Appl. No.: 10/967,948

(22) Filed: Oct. 19, 2004

(65) Prior Publication Data

US 2005/0094061 A1    May 5, 2005

(30) Foreign Application Priority Data

Nov. 5, 2003  (KR) ............... 10-2003-0078047

(51) Int. Cl.
*G02F 1/1335*    (2006.01)
(52) U.S. Cl. .............. 349/106; 349/110; 349/155; 349/187
(58) Field of Classification Search ......... 349/106, 349/108, 110, 111, 122, 138, 187, 123, 155; 430/7, 20, 22; 359/891; 428/1.1, 1.3
See application file for complete search history.

(56) References Cited

U.S. PATENT DOCUMENTS

| | | | |
|---|---|---|---|
| 5,248,576 A * | 9/1993 | Yokoyama et al. ............ 430/7 |
| 5,712,065 A | 1/1998 | Chiang | |
| 5,925,484 A | 7/1999 | Shima et al. | |
| 6,147,729 A | 11/2000 | Kurauchi et al. | |
| 6,183,917 B1 * | 2/2001 | Sakamoto et al. ............ 430/7 |
| 6,323,921 B1 | 11/2001 | Kurauchi et al. | |
| 6,392,735 B1 | 5/2002 | Tani | |
| 6,577,374 B1 | 6/2003 | Nakata et al. | |
| 6,596,446 B2 * | 7/2003 | Wolf et al. ................. 430/7 |
| 2001/0007733 A1 * | 7/2001 | Matsuyama et al. .......... 430/7 |

FOREIGN PATENT DOCUMENTS

| | | |
|---|---|---|
| JP | 7 181316 | 7/1995 |
| JP | 8 095021 | 4/1996 |
| JP | 9 230124 | 9/1997 |
| JP | 10160927 | 6/1998 |
| JP | 10 197713 | 7/1998 |
| JP | 10 221696 | 8/1998 |
| JP | 11 212076 | 8/1998 |
| JP | 10 239513 | 9/1998 |

(Continued)

*Primary Examiner*—Toan Ton
*Assistant Examiner*—Tai Duong
(74) *Attorney, Agent, or Firm*—Brinks Hofer Glison & Lione

(57) ABSTRACT

A method of fabricating a color filter substrate of an LCD is disclosed. By forming the color filter layer from a hydrophobic material, a fluid black matrix material deposited on the surface of the substrate including the color filter layer flows from the surface of the color filter layer and accumulates between sub-color filters of the color filter layer. The black matrix material is then hardened, permitting the black matrix to be formed between the sub-color filters but not on the color filter layer. Accordingly, the number of mask processes for forming a black matrix is reduced. Further, since the black matrix is only disposed between the sub-color filters, an overcoat layer to eliminate the step difference due to the color filters need not be formed.

29 Claims, 4 Drawing Sheets

FOREIGN PATENT DOCUMENTS

| | | |
|---|---|---|
| JP | 2000 075305 | 3/2000 |
| JP | 2001 108815 | 4/2001 |
| JP | 2002 029206 | 1/2002 |
| JP | 2002 131902 | 5/2002 |
| JP | 2003 015294 | 1/2003 |
| JP | 2003 177228 | 6/2003 |

* cited by examiner

COLOR FILTER SUBSTRATE AND METHOD FOR FABRICATING THEREOF

PRIORITY CLAIM

This application claims the benefit of Korean Application No. 78047/2003, filed on Nov. 5, 2003, which is hereby incorporated by reference as if fully set forth herein.

BACKGROUND

1. Technical Field

The present invention relates to a method for fabricating a liquid crystal display device, and more particularly, to a method for fabricating a color filter substrate, using a small number of masks.

2. Description of the Related Art

A liquid crystal display (LCD) device displays an image using a liquid crystal driven according to an applied signal. The LCD includes an upper substrate and a lower substrate.

In general, the upper substrate is a color filter substrate for displaying an image in color, and the lower substrate is a TFT array substrate on which unit pixels are arranged in a matrix configuration.

A structure of an LCD panel comprising the upper substrate 150 and the lower substrate 100 will now be described with reference to FIG. 1.

As shown in FIG. 1, a plurality of gate lines 101 are arranged parallel to one another on the lower substrate 100. In addition, a plurality of data lines 102 are arranged parallel to one another and perpendicularly to the gate lines 101 on the lower substrate 100. Unit pixel regions are defined by intersection of the gate lines 101 and the data lines 102, and the defined unit pixels are arranged on a TFT array substrate in a matrix configuration.

In addition, a switching device 103 for driving the unit pixel is formed at every intersection of the gate lines 101 and the data lines 102.

A thin film transistor (TFT) is commonly used as a switching device, and includes a gate electrode, a source electrode, a drain electrode and a channel layer. The gate electrodes are connected to the gate lines 101, and the source electrodes are connected to the data lines 102.

In addition, pixel electrodes 104 for applying an electric field to a liquid crystal 110 are formed on the lower substrate 100, and an alignment layer (not shown) for alignment of the liquid crystal 110 is formed on the pixel electrode 104 over an entire surface of the lower substrate 100. An organic layer such as polyimide is commonly used as the alignment layer, and alignment of the liquid crystal is prepared through a rubbing in which the alignment layer is rubbed with a rubbing cloth or the like after having been applied.

In addition, spacers (not shown) for maintaining a uniform cell gap between the attached lower substrate 100 and upper substrate 150 are scattered on the alignment layer.

Also, a sealant (not shown) is formed along an outer edge of a pixel region of the lower substrate 100 in order to attach the upper substrate and the lower substrate and prevent leakage of an injected liquid crystal.

Next, a structure of an upper substrate 150 for displaying an image in color will now be described.

A black matrix 151 for cutting off unnecessary light proceeding from the lower substrate 100 is formed as a matrix type on the upper substrate 150, and a color filter for displaying an image in color is formed on the black matrix. In general, red, green and blue (R, G and B) sub-color filters 152 are formed as one group for each unit pixel.

An overcoat layer 153 for compensating a step difference of a color filter layer may be formed on the color filter layer.

A common electrode 154 for applying an electric field to the liquid crystal together with the pixel electrode 104 of the lower substrate 100 is formed on the overcoat layer 153, and an alignment layer (not shown) for alignment of the liquid crystal is formed on the common electrode 154. Spacers (not shown) for maintaining a cell gap between the upper substrate 150 and the lower substrate 100 may be formed on the alignment layer. The spacers are formed on one of the upper substrate 150 and the lower substrate 100.

A structure of a color filter substrate, an upper substrate of an LCD device, will now be briefly described with reference to FIG. 2.

As for the color filter substrate, a black matrix 202 is formed on a substrate made of a transparent material. The black matrix 202 may be an opaque metallic thin film or a chemical resin which cuts off unnecessary light proceeding from the TFT array substrate, the lower substrate of the LCD device.

The black matrix 202 is formed as a matrix type, corresponding to the gate lines arranged in a longitudinal direction and the data lines arranged in a horizontal direction. A color resin for displaying an image in color is formed at each pixel region defined by the black matrix. Three different color resins (R, G and B color resins) are formed as one group for each unit pixel.

In addition, to compensate a step difference of the color filter and protect the color filter layer, a transparent overcoat layer 204 may be further formed on the color filter layer 203.

A common electrode 205, a transparent electrode for applying an electric field to a liquid crystal, is further formed on the overcoat layer 204, and spacers 206 for maintaining a cell gap of the LCD device are formed on the common electrode 205.

In addition, an alignment layer 207 for an alignment of the liquid crystal injected between the color filter substrate and the TFT array substrate is further formed on the spacer 206.

Next, a fabrication process of the color filter substrate of the LCD device adopting such a structure will now be briefly described with reference to FIGS. 3A to 3D.

First, a layer for forming a black matrix made of a metallic material or a resin material is formed on a transparent substrate.

In general, the black matrix is formed between the R, G and B sub-color filters in order to cut off light passing through a reverse tilt domain formed around the pixel electrode of the lower TFT array.

In general, a metallic thin film of chrome (Cr) or the like, the optical density of which is greater than 3.5, or an organic material such as carbon or the like is mainly used as the black matrix. To achieve low reflection, double layers such as chrome/chrome oxide (Cr/CrO$_x$) may be used as the black matrix.

If the metallic thin film is used as the black matrix, a pattern may be formed on the metallic thin film by photolithography, and if a resin made of a photosensitive organic material is used as the black matrix, the pattern may be formed on the resin by an exposure process and a development process.

FIG. 3A shows a black matrix 202 having a pattern and formed on a substrate 201. In order to form the black matrix on the substrate, a first mask including a pattern for forming a black matrix is required.

After the black matrix has been formed 202, as shown in FIG. 3B, a color filter layer 203 including R, G and B sub-color filters 203a, 203b, and 204c, respectively, for displaying an image in color is formed.

The color filter may be fabricated by various methods such as a dyeing method, an electrodepositing method, a pigment dispersing method, a printing method or the like. As one example, a process for fabricating a color filter by the pigment dispersing method will now be described.

First, one of R, G and B color resins is applied on an entire surface of the substrate 201 on which the black matrix 202 has been formed (herein, the color resins are applied in order of R, G and B, but the applying order of the color resin can be set randomly). Then, exposure is selectively performed on the applied R color resin, thereby forming an R sub-color filter layer 203 at a desired region.

Then, the G color resin is applied on the substrate on which the R sub-color filter layer has been formed, and selective exposure is performed on the applied G color resin, thereby patterning a G sub-color filter layer 203b at a corresponding region. The same process is performed on the B color resin, thereby forming a B sub-color filter layer 203c. That is, when the color filter layer is formed, an exposure process is repeatedly performed using a second mask.

That is, in order to form the R, G and B sub-color filters, a mask process including exposure and development, and cleaning is performed three times.

After the color filter layer 203 has been formed, as shown in FIG. 3C, a transparent overcoat layer 204 of an organic layer component is formed in order to compensate a step difference of the color filter layer.

After the overcoat layer 204 has been formed, an ITO (Indium Tin Oxide) film 205, a transparent electrode for applying an electric field to a liquid crystal layer is further formed. The ITO film works as a common electrode 205.

Spacers 206 are formed on the common electrode 205 to maintain a uniform cell gap of the LCD device. In order to form the spacer, a scattering method in which ball type spacers are scattered or a patterning method in which a size, a height and a position of the spacer can be determined may be used.

The scattering method may be divided into a wet scattering method in which spacers are mixed with alcohol or the like and then scattered and a dry scattering method in which only spacers are scattered. Also, as the dry scattering method, there are a dry scattering method using static electricity and a non-electrostatic scattering method using air pressure, and the non-electrostatic scattering method is commonly used for a liquid crystal cell structure which is vulnerable to static electricity.

However, in the scattering method, the position and the height of the scattered spacer may not be determined. Therefore, a column spacer formation method which can increase an aperture ratio is being used.

In the column spacer formation method, a photosensitive resin for forming a spacer is applied on the common electrode, the applied resin is exposed by using a mask, and then the exposed resin is developed and cleaned, thereby forming a certain pattern. At this time, a mask process is further required.

After the spacer has been formed on the common electrode, an alignment layer is formed by depositing an organic layer made of polyimide or the like and rubbing the organic layer in a desired direction.

The color filter substrate of the LCD device is completed after completing these processes.

However, when the color filter substrate according to the related art is fabricated, many mask processes are required, which causes process delay and a decrease in productivity. Also, in one mask process, a series of processes such as deposition of a photosensitive layer, exposure of the photosensitive layer, cleaning of the photosensitive layer and the like are performed. For this reason, by reducing one mask process, productivity may be greatly improved and fabrication costs of the LCD device may be remarkably reduced.

BRIEF SUMMARY

By way of introduction only, in an embodiment of the present invention, in a fabrication process of a color filter substrate of one side substrate of an LCD panel, for example, a black matrix is formed on the substrate without using a mask.

In one embodiment, a method for fabricating a color filter substrate comprises: forming color filter layers on the substrate; forming an organic layer between the color filter layers; and forming a black matrix by hardening the organic layer.

In another embodiment, a method for fabricating a color filter includes forming hydrophobic color filter layers on the substrate, providing a fluid material on the color filter layers, and forming a black matrix by hardening the fluid. The fluid flows across a surface of the color filter layers to between the color filter layers.

In one embodiment, the color filter substrate contains a color filter layer including sub-color filter layers on the substrate, an organic and/or hydrophobic black matrix between the sub-color filter layers, and an alignment layer on the sub-color filter layers and the black matrix layer.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of the embodiments of the invention.

In the drawings.

DETAILED DESCRIPTION

Reference will now be made in detail to the preferred embodiments of the present invention, examples of which are illustrated in the accompanying drawings.

Hereinafter, a process for fabricating a color filter substrate according to one embodiment of the present invention will now be described with reference to FIGS. 4 to 5D.

Figure 1:
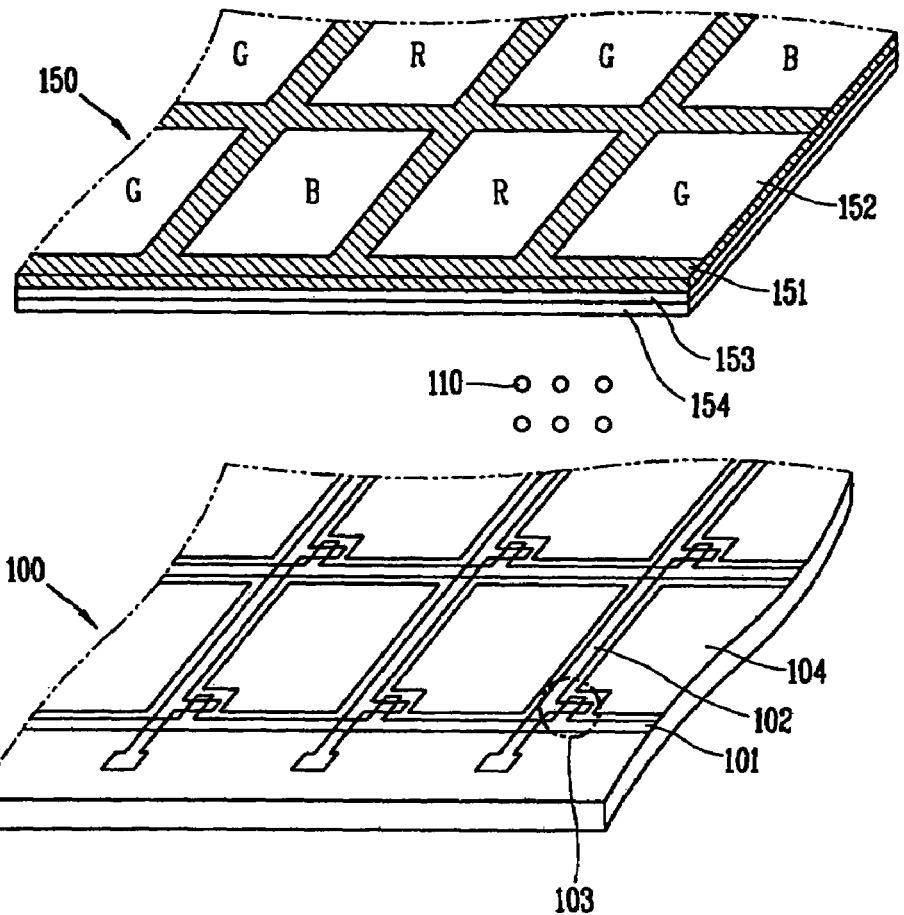
FIG. 1 is a schematic perspective view showing a structure of an LCD device according to the related art.
Figure 2:
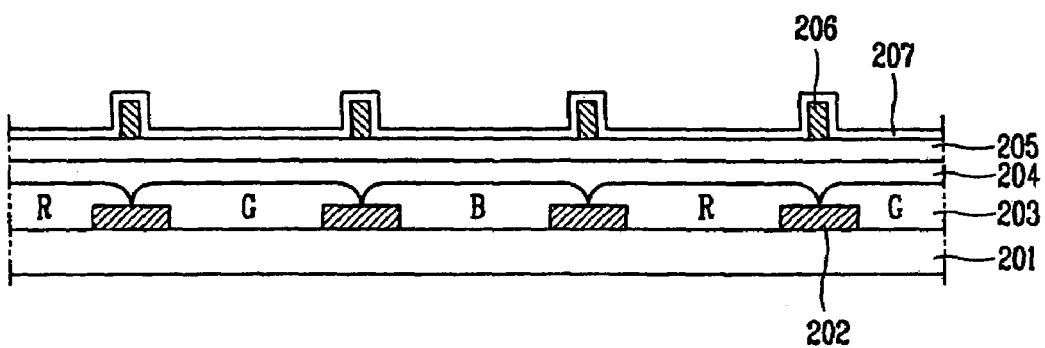
FIG. 2 is a sectional view showing a sectional view of a color filter substrate according to the related art.
Figure 3A:
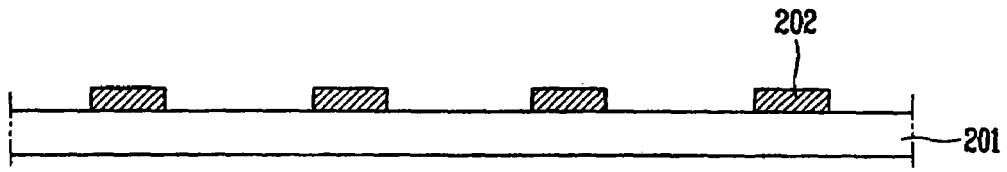
FIGS. 3A to 3D show sequential process for fabricating a color filter substrate according to the related art.
Figure 3B:
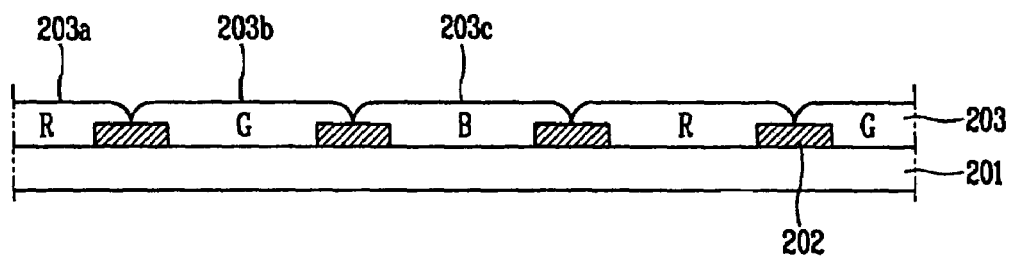
Figure 3C:
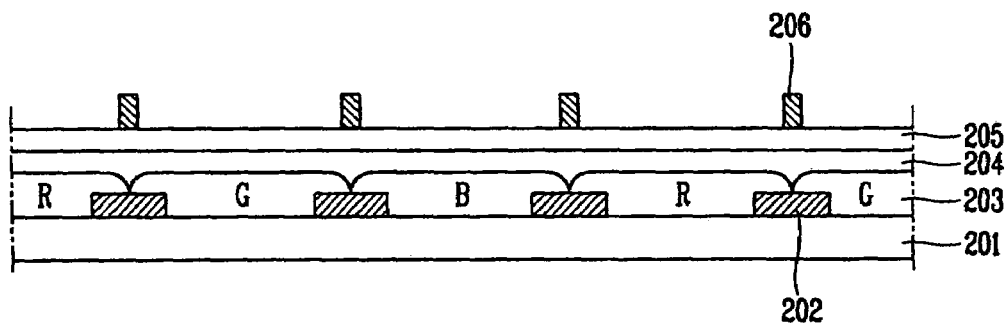
Figure 3D:
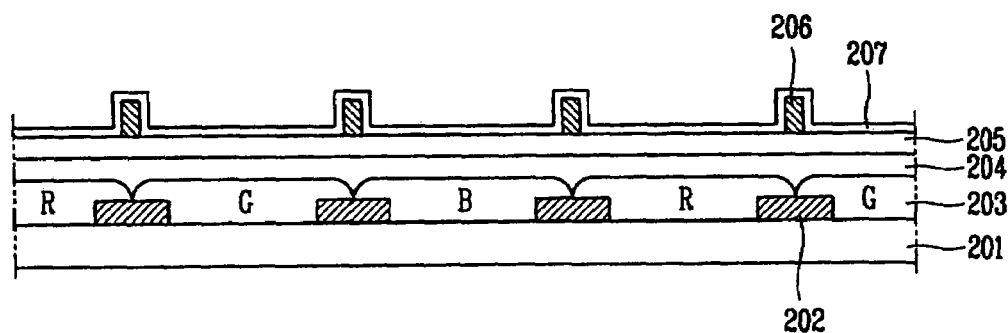
Figure 4:
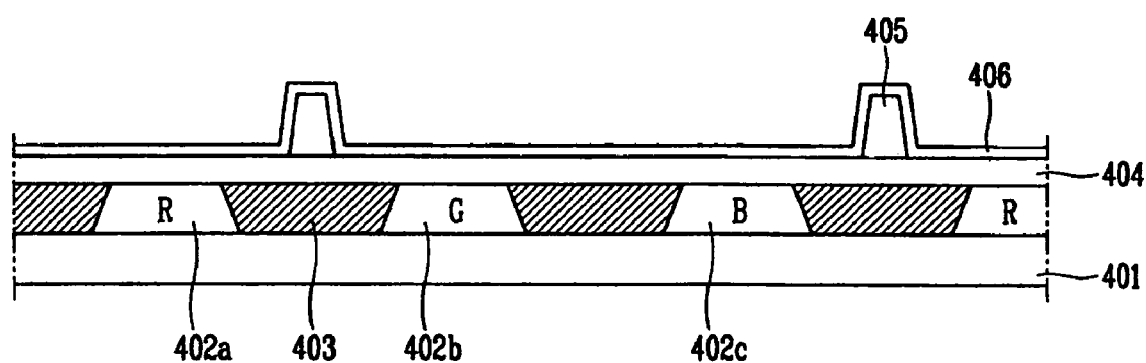
FIG. 4 is a sectional view of a color filter substrate according to the present invention.

FIG. 4 shows a section of a TN mode color filter substrate in which a common electrode is formed on a color filter substrate as one embodiment of the present invention.

As shown in FIG. 4, R, G and B sub-color filters 402a, 402b and 402c are formed in a matrix configuration on a transparent substrate 401. The sub-color filters are formed in an island type in which sub-color filters are separated from each other.

In addition, a black matrix 403 for cutting off unnecessary light proceeding from a lower substrate of an LCD panel is formed between the sub-color filters. The black matrix is not formed on the sub-color filters.

In addition, a common electrode 404 for applying an electric field to a liquid crystal layer (not shown) is formed on the sub color filter layers.

Spacers 405 of an organic layer component are arranged on the common electrode 404 in order to maintain a cell gap between an upper substrate and a lower substrate of an LCD panel. The spacers are preferably formed on the black matrix in order to improve an aperture ratio of an LCD device.

In addition, an alignment layer 406 for alignment of the liquid crystal layer is further formed on the spacer 405. An organic layer such as polyimide may be used as the alignment layer 406.

A fabrication method of a color filter layer according to one embodiment of the present invention having such a structure will now be described in detail with reference to FIG. 5.

Figure 5A:
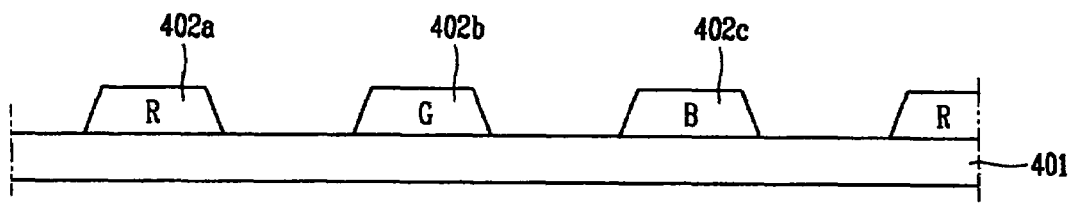
FIGS. 5A to 5D show sequential process for fabricating a color filter substrate in accordance with the present invention.
Figure 5B:
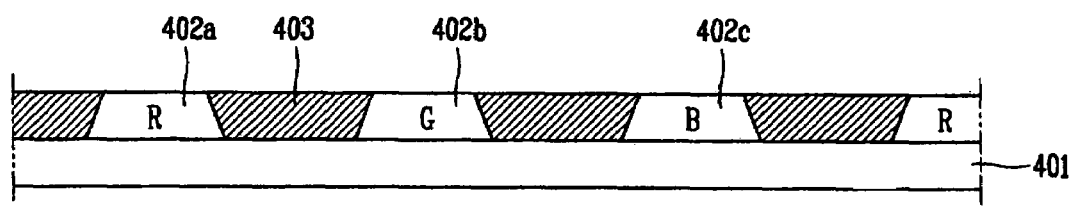

First, as shown in FIG. 5A, a color filter layer including R, G and B sub-color filter layers 402a, 402b, 402c is formed on a transparent substrate. The color filter layers may be formed by a method such as a printing method, an electrodepositing method, a dyeing method, or a pigment dispersing method or the like. In the present invention embodiment, a fabrication process by the pigment dispersing method by which a sub-color filter pattern may be precisely controlled will be described. However, the formation method of the color filter layer is not limited by the pigment dispersing method.

In the method for forming the color filter layer by the pigment dispersing method, one of the R, G and B color filters is applied to an entire surface of the substrate. The R, G and B color filters may be formed in random order, and, in the present embodiment, the color filters are formed in order of R, G and B.

After the photosensitive R color filter has been formed on the substrate, the R color filter is exposed with a mask having a pattern for an R sub color filter. Here, a negative type photosensitive organic layer that is hardened when exposed may be used as the photosensitive R color filter layer.

After the R sub-color filter has been formed, a photosensitive G color filter layer is formed on an entire surface of the substrate. A negative type photosensitive organic layer is also used as the G color filter layer. An exposure process may be performed on an organic layer for forming the G sub-color filter upon applying the mask used to form the R color filter layer. The same mask may be used if the R and G sub-color filter layers and a B sub-color filter layer to be formed thereafter have the same pattern. But, each of the R, G and B sub-color filter layers may be formed by an individual mask.

Next, the blue sub-color filter layer is formed by the same method.

The color filer layer is formed of hydrophobic resin so that the black matrix, a fluidic organic layer, is not absorbed by the color filter layer. In order to make the hydrophobic color filter layer, polymers, which can hydrophobicly interact with an organic component in the color filter layer, may be added into the color filter layer. A hydrophobic polymer such as, polypropylene oxide, polybutylene oxide, polytetramethylene oxide, fatty polyester, wherein the fatty polyester includes polylactide, polyglycollide, lactide-glycollide copolymer, polybutylade or the like may be used. These polymers are bonded to hydroxyl (OH) groups in the color filter, so that a functional group of the color filter component, which is bonded to other materials, may be removed. Therefore, a color filter layer without the functional group has a hydrophobic property, and, although the fluid black matrix material is formed on the color filter layer, the black matrix material is not absorbed by the color filter and can thus be removed from the surface of the color filter layer.

After the hydrophobic color filter layer has been formed, an entire surface of the substrate is formed with a black matrix, an opaque organic layer having fluidity.

Although the entire surface of the substrate on which the color filter has been formed is formed with the black matrix, the black matrix is not formed on the hydrophobic color filter layer but instead flows along the surface and down between the sub-color filters. Accordingly, the black matrix is formed only between the sub-color filters.

Next, by heating the black matrix between the color filters, a solvent included in the black matrix is removed, and the black matrix is hardened. As a hardening method, a thermosetting method may be used. In the thermosetting method, the substrate on which the black matrix has been formed is heated in a high temperature chamber.

By forming a hydrophobic color filter layer 303 and then forming a black matrix, a separate mask process for forming a black matrix may not be performed. By omitting the mask process, the number of high-priced masks that are used to fabricate the color filter substrate may be reduced, and the number of processes, such as exposure, development, and cleaning, may be reduced.

In addition, since the black matrix is not formed on the hydrophobic color filter layer and its volume is somewhat reduced as the black matrix is hardened, a separate process for forming an overcoat layer may not be performed.

Figure 5C:
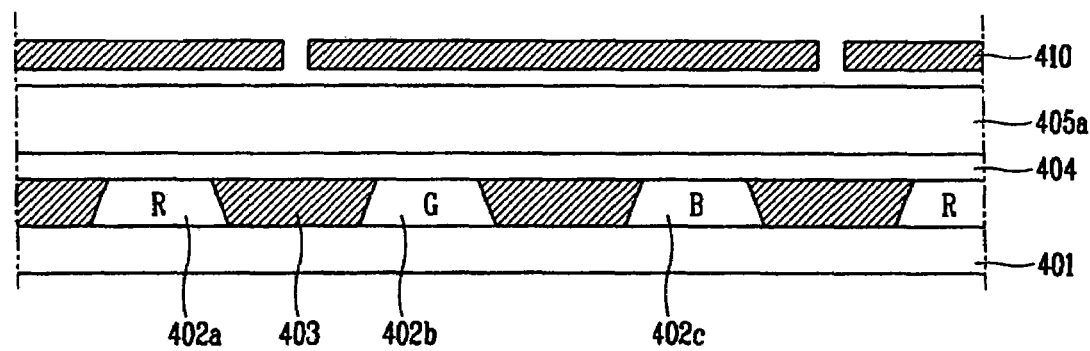
Figure 5D:
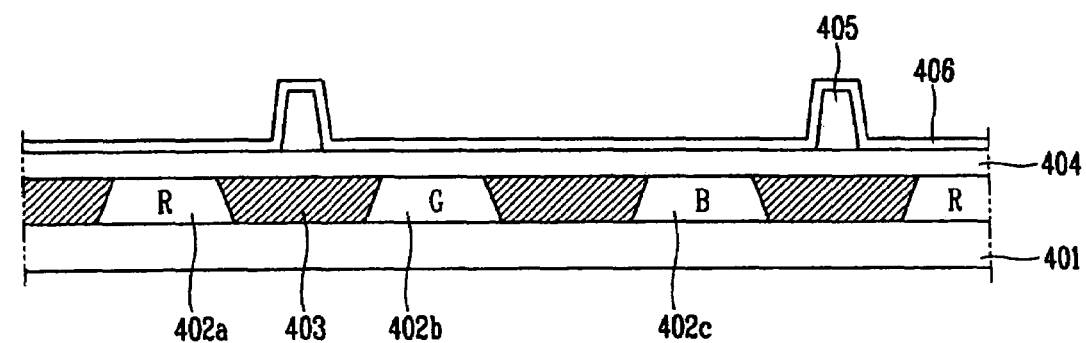

Next, as shown in FIG. 5C, in a TN (twisted nematic) mode, a common electrode 404 for applying an electric field to a liquid crystal is formed on the substrate on which the black matrix has been formed. But, in an IPS (in plane switching) mode, since the common electrode is not formed on the color filter, this process may be unnecessary.

However, since the IPS mode LCD is sensitive to static electricity, an ITO film may be formed at a back surface or an inner surface of the substrate in order to protect the LCD from outside static electricity, and then the process for forming the color filter may be performed.

Next, after the common electrode 404 has been formed, a photosensitive organic layer 405a for forming a spacer 405 is formed on the common electrode. A mask 410 for forming a spacer is applied on the photosensitive organic layer 405a, and an exposure, a development and a cleaning process are performed thereon, thereby forming a spacer 405. The spacer 405 maintains a cell gap between a lower substrate and an upper substrate of an LCD panel. In order to maintain the cell gap, a patterned spacer whose shape and position may be controlled may be formed, and a ball spacer which may be formed by a scattering method may be formed.

In addition, the patterned spacer may be formed on the black matrix 403 or may be formed elsewhere at a predetermined position. In addition, more than one patterned spacers may be formed per unit pixel region having one group having R, G and B sub-color filter layers, or the number of spacers may be varied as desired.

After the spacer 405 has been formed, an alignment layer 406 of polyimide is formed on the substrate on which the spacer has been formed. The alignment layer forming process includes a rubbing process.

As described above, by forming the alignment layer, the color filter substrate is completed.

The completed color filter substrate is attached to a TFT array substrate, formed through a separate process. After attachment, the attached substrates are cut by unit panel, and a liquid crystal injection process is performed, thereby a completed LCD panel is formed. A liquid crystal layer may also be formed by a liquid crystal dispensing method rather than the liquid crystal injection method. When the liquid crystal layer is formed by the dispensing method, the liquid crystal may be dropped onto at least one of a color filter substrate and a TFT array substrate, and then the two substrates are attached each other in a vacuum environment, thereby completing an LCD panel. Then, the LCD panel passes through a cutting process, thereby obtaining an individual LCD panel.

As another embodiment of the present invention, IPS mode LCD may be formed. In the IPS mode LCD, the common electrode is formed on the TFT array substrate rather than the color filter substrate. Except for forming the common electrode, the fabricating process for forming the IPS mode color filter substrate is similar to that of the TN mode color filter substrate.

That is, a process for fabricating the IPS mode color filter substrate includes forming a hydrophobic color filter layer on a substrate; forming a black matrix between the color filters; forming spacers on the black matrix; and forming an alignment layer on the spacers.

When the IPS mode color filter layer, which is sensitive to static electricity, is formed, an ITO layer may be further formed at a back surface or an inner surface of the substrate in order to prevent the static electricity.

As described, in embodiments of the present invention, by forming a hydrophobic color filter layer and forming a black matrix having fluidity thereon, a special mask may not be used to form the black matrix. In addition, since the black matrix is formed flat on the color filter layer, a process of forming an overcoat layer may not be performed. Accordingly by reducing the number of masks used in the processes, fabrication costs may be reduced. In addition, by reducing the number of mask processes, an exposure, a development and a cleaning process, which are followed by one mask process, may not be performed, thereby improving productivity.

What is claimed is:
1. A method for fabricating a color filter, the method comprising:
   forming color filter layers on a substrate;
   forming an organic layer between the color filter layers; and
   forming a black matrix by hardening the organic layer, wherein the black matrix is formed on the substrate without using a mask.
2. A method for fabricating a color filter, the method comprising:
   forming hydrophobic color filter layers on a substrate;
   forming an organic layer between the hydrophobic color filter layers; and
   forming a black matrix by hardening the organic layer.
3. The method of claim 2, wherein forming the color filter layers comprises:
   forming a first sub-color filter layer;
   forming a second sub-color filter layer separated from the first sub-color filter layer; and
   forming a third sub-color filter layer separated from both the first sub-color filter layer and the second sub-color filter layer.
4. The method of claim 2, wherein forming the black matrix comprises hardening the organic layer by heating.
5. The method of claim 2, further comprising forming a common electrode on the substrate.
6. The method of claim 5, further comprising forming the common electrode in contact with the black matrix and color filter layers.
7. The method of claim 2, wherein the black matrix and color filter layers are planar when initially provided on the substrate.
8. The method of claim 2, further comprising:
   forming a spacer on the substrate; and
   forming an alignment layer on the spacer.
9. The method of claim 2, wherein the color filter layer includes at least one of polypropylene oxide, polybutylene oxide, polytetramethylene oxide, polylactide, polyglycollide, lactide-glycollide copolymer, and polybutylade.
10. The method of claim 2, further comprising providing the organic layer over substantially an entire surface of the substrate and permitting the organic layer to flow from a surface of the color filter layer to between the color filter layer.
11. The method of claim 2, wherein the black matrix is formed on the substrate without using a mask.
12. A color filter substrate comprising:
   a hydrophobic color filter layer including sub-color filter layers on a substrate;
   a black matrix between the sub-color filter layers, the black matrix containing an organic layer;
   a common electrode in contact with the black matrix and sub-color filter layers; and
   an alignment layer on the sub-color filter layers and the black matrix layer.
13. The substrate of claim 12, wherein the sub-color filter layers include Red, Green and Blue sub-color filters separated from each other.
14. The substrate of claim 12, wherein the black matrix and sub-color filter layers are planar when initially provided on the substrate.
15. The substrate of claim 12, further comprising a spacer on the substrate.
16. A method for fabricating a color filter, the method comprising:
   forming hydrophobic color filter layers on a substrate;
   providing a fluid material between the color filter layers; and
   forming a black matrix by hardening the fluid material.
17. The method of claim 16, wherein forming the black matrix comprises hardening the fluid material by heating.
18. The method of claim 16, further comprising forming a common electrode on the substrate.
19. The method of claim 18, wherein the common electrode is in contact with the black matrix and color filter layers.
20. The method of claim 16, wherein the black matrix and color filter layers are planar when initially provided on the substrate.
21. The method of claim 16, further comprising:
   forming a spacer on the substrate; and
   forming an alignment layer on the spacer.
22. The method of claim 16, wherein the color filter layer includes at least one of polypropylene oxide, polybutylene oxide, polytetramethylene oxide, polylactide, polyglycollide, lactide-glycollide copolymer, and polybutylade.

23. The method of claim 16, further comprising providing the fluid material over substantially an entire surface of the substrate.

24. The method of claim 16, wherein the fluid material is formed on the substrate without using a mask.

25. The method of claim 16, wherein the fluid material flows across a surface of the color filter layers to between the color filter layers.

26. A substrate comprising:

a hydrophobic color filter layer including sub-color filter layers on the substrate;

a black matrix between the sub-color filter layers;

a common electrode in contact with the black matrix and sub-color filter layers; and an alignment layer on the sub-color filter layers and the black matrix layer, wherein the hydrophobic sub-color filter layers are substantially uniform.

27. The substrate of claim 26, further comprising a spacer on the common electrode.

28. The substrate of claim 27, wherein the spacer is disposed above the black matrix between the alignment layer and the common electrode.

29. The substrate of claim 26, wherein the black matrix and sub-color filter layers are planar.

\* \* \* \* \*